United States Patent [19]

Knab

[11] Patent Number: 4,621,683

[45] Date of Patent: Nov. 11, 1986

[54] HEAT EXCHANGER WITH VALVED PIPE CONNECTION

[75] Inventor: Rudiger Knab, Cologne, Fed. Rep. of Germany

[73] Assignee: Ford Motor Company, Dearborn, Mich.

[21] Appl. No.: 740,793

[22] Filed: Jun. 3, 1985

Related U.S. Application Data

[62] Division of Ser. No. 474,992, Mar. 14, 1983, abandoned.

[51] Int. Cl.⁴ .................... F28D 11/00; F28F 5/00
[52] U.S. Cl. .................................... 165/86; 165/96
[58] Field of Search ............................ 165/86, 96

[56] References Cited

U.S. PATENT DOCUMENTS

| | | | |
|---|---|---|---|
| 1,798,892 | 3/1931 | Murray, Jr. | 165/86 X |
| 2,105,692 | 1/1938 | Hunicke | 165/86 |
| 2,147,283 | 2/1939 | Covell | 165/86 |
| 2,359,454 | 10/1944 | Whelan | 165/86 X |
| 3,285,327 | 11/1966 | Herrick | 165/86 X |

Primary Examiner—Albert W. Davis, Jr.
Assistant Examiner—Peggy Neils
Attorney, Agent, or Firm—Daniel M. Stock; Clifford L. Sadler

[57] ABSTRACT

A heating and ventilating unit for motor cars of decreased structural volume and increased efficiency provides air temperature regulation by a heat exchanger which may be variably slidably moved into the fresh air stream with its surface acted upon in a defined constant position approximately at right angles to the fresh air stream from a heat-insulated space into the fresh air stream.

2 Claims, 6 Drawing Figures

HEAT EXCHANGER WITH VALVED PIPE CONNECTION

This is a division, of application Ser. No. 474,992, filed Mar. 14, 1983, now abandoned.

BACKGROUND OF THE INVENTION

The invention relates to heating and ventilating units for motor cars of the type in which air temperature regulation is effected by movement of a heat exchanger's operative surface into an air stream operatively associated with a blower.

A heating and ventilating unit of this type is known from the German Offenlegungsschrift (Laid-Open Specification) 22 08 377, in which a parallelepipedonal heat exchanger rests edgewise against a vertical wall of a fresh air duct in its cold position and may be pivoted about a lower transverse axis into its hot position completely spanning the fresh air duct.

The known heating and ventilating unit has various disadvantages. One disadvantage is that even when the heat exchanger is in the cold position, the fresh air flowing past it is heated in an undesirable manner. A further disadvantage is that a complicated deflection of the fresh air stream is necessary in order to achieve a favorable vertical flow through the heat exchanger.

Further disadvantages arise from the arrangement of the heat exchanger which is accessible only with difficulty and the blower disposed in the passenger compartment, as a result of which it is difficult to replace a defective heat exchanger on the one hand and a disturbing awareness of blower noises in the passenger compartment is to be expected on the other hand.

SUMMARY OF THE INVENTION

The object of the invention is to solve the following technical problems in a simple manner:

(a) the heating and ventilating unit should have a compact structural volume;
(b) the heat exchanger should be arranged so as to be easily interchangeable for the purposes of repairs and re-equipping;
(c) the heat exchanger should be arranged in such a way that an undesired heating of the fresh air is avoided in the cold position and optimum heating of the fresh air is achieved in the hot position;
(d) it should be possible to adjust the temperature distribution to the outlet nozzles in accordance with a predetermined standard characteristic;
(e) the entire unit should have as low a flow resistance as possible; and
(f) disturbing blower noises which are audible in the passenger compartment should be avoided by the blower being disposed in a manner known per se in an air chamber on the side of the engine space, as a result of which better protection from the noise may be achieved and, in addition, the heating and ventilating unit may be changed over in known manner to a complete air conditioning unit by the interposition of an evaporator.

By virtue of the fact that the heat exchanger may be slid into the fresh air stream from a heat insulated space in a defined constant position approximately at right angles to the said fresh air stream, a compact structural volume is achieved on the one hand and an easy exchange of the heat exchanger is ensured on the other hand. Furthermore, undesired heating of the fresh air is avoided in the cold position of the heat exchanger, while optimum heating of the fresh air is achieved in the hot position on account of the favorable throughflow.

By virtue of the fact that the heat exchanger may be slid into the fresh air stream in a linear or curving manner, both a sliding and a pivoting guidance may be employed.

By virtue of the fact that the heat exchanger may be displaced by only part of its depth, and a heat-insulating covering flap selectively covers or leaves free the part of the heat exchanger projecting into the fresh air stream, a further reduction in the structural volume can be achieved while the mode of operation remains equally advantageous.

BRIEF DESCRIPTION OF THE DRAWINGS

The invention is described in greater detail with reference to two examples of embodiment illustrated in the drawings, in which.

DESCRIPTION OF THE PREFERRED EMBODIMENTS

Figure 1:
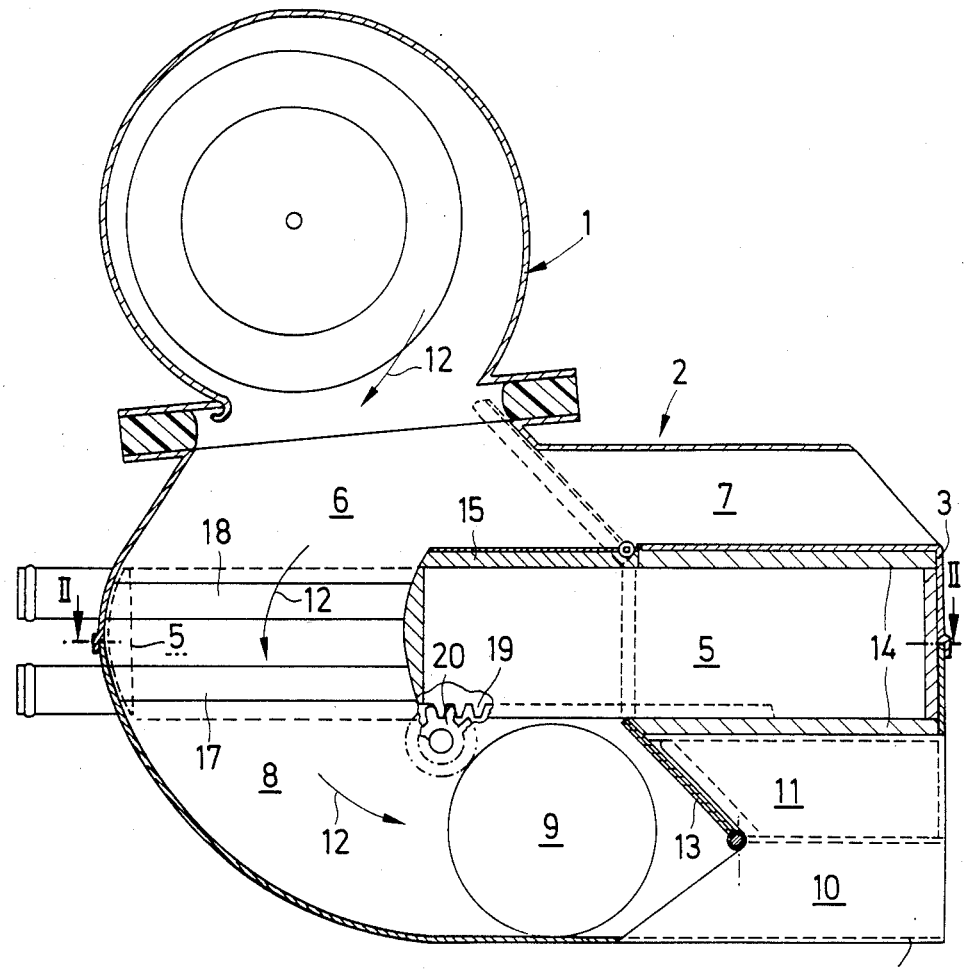
FIG. 1 is a vertical section through a heating and ventilating unit.

In the Figures, a heating and ventilating unit for motor cars comprises a blower unit 1 known per se which is disposed in a fresh air chamber situated beneath the windshield, and a heating unit 2 which is disposed inside the passenger compartment of the motor car beneath the dashboard.

The heating unit 2 essentially comprises an upper casing 3 and a lower casing 4, between which a parallelepipedonal heat exchanger 5 is interposed.

The upper casing 3 forms an upper part 6 of a fresh air duct, from which a fresh air duct 7 branches off for connection to central nozzles (not shown) on the dashboard by way of conventional connecting hoses (not shown).

The lower casing 4 forms the lower part 8 of a fresh air duct and lateral connecting ducts 9 communicating with lateral nozzles (not shown), connecting ducts 10 communicating with defroster nozzles (not shown) and connecting ducts 11 communicating with leg room outlets (not shown).

A fresh air stream coming from the blower unit 1 and indicated by arrows 12 flows essentially unobstructed past the part of the heat exchanger 5 projecting into the fresh air duct 6, 8 and is distributed accordingly in the region of the lateral connecting ducts 10 and 11 by way of a single-leaf flap 13.

In this connection the heat exchanger 5 is disposed in a heat-insulated space 14 and its part projecting into the fresh air duct 6, 8 is covered by a heat-insulated covering flap 15.

The heat exchanger 5 is provided in conventional manner with lateral water compartments 16, usually one of which is connected to an inlet and outlet pipe 17 and 18, respectively. At the two lower longitudinal edges of the water compartments 16, toothed rack profiles 19 may be provided which engage with corresponding pinions 20 which may be actuated by way of a suitable handle in order to displace the heat exchanger 5.

If the pinions 20 are actuated, the heat exchanger 5 is moved to the left in FIG. 1 by way of the toothed racks 19 and eventually reaches its hot position indicated by broken lines. Simultaneously with the movement of the heat exchanger 5, the insulated covering flap 15 is raised and closes completely or only partially the fresh air duct 7 to the central nozzles.

In the hot position of the heat exchanger 5 indicated in dotted lines, therefore, the entire fresh air stream 12 must flow through the heat exchanger.

In this connection, it is particularly advantageous that the flow direction remains essentially constant.

If the heat exchanger 5 is moved only partially into the fresh air duct 6, 8, the flow direction which remains essentially constant results in air stratification in the lower part of the fresh air duct 8, in which there is cooler air toward the outside of the casing and hotter air toward the inside of the casing. In the chosen arrangement of the connecting ducts 11 for the leg room in the upper region, this air stratification is highly desirable.

Figure 2:
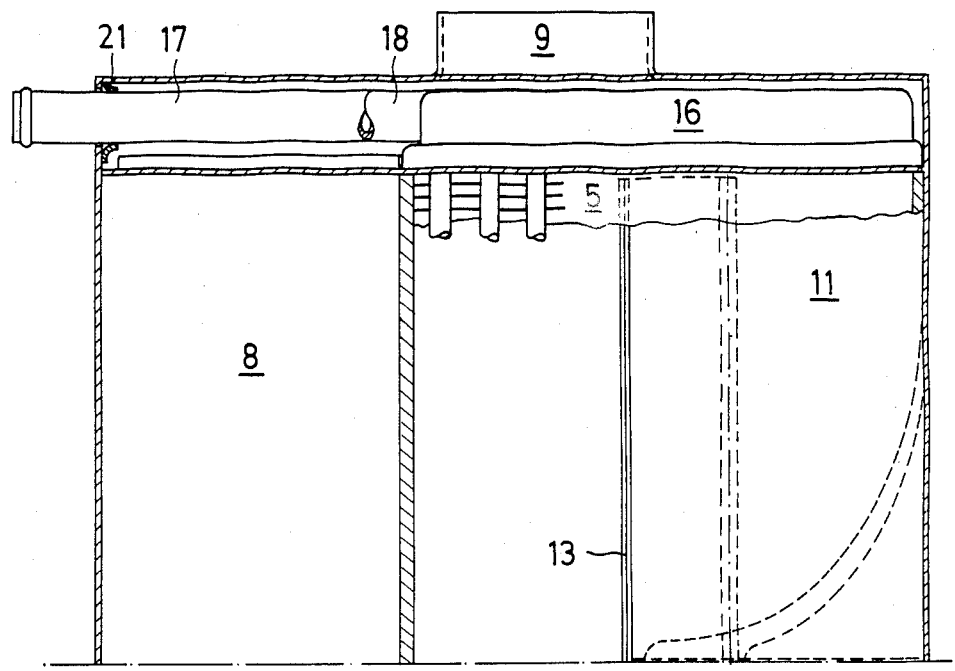
FIG. 2 is the right-hand half of the section along the line II—II in FIG. 1.

As may be seen in FIG. 2, the connecting and return pipes 17 and 18 of the heat exchanger 5 are conducted out of the casing in an air-tight manner by way of seals 21. In this connection the inlet and return pipes 17 and 18 may be connected to the cooling system of the internal combustion engine in known manner by way of hose pipes.

Figure 4:
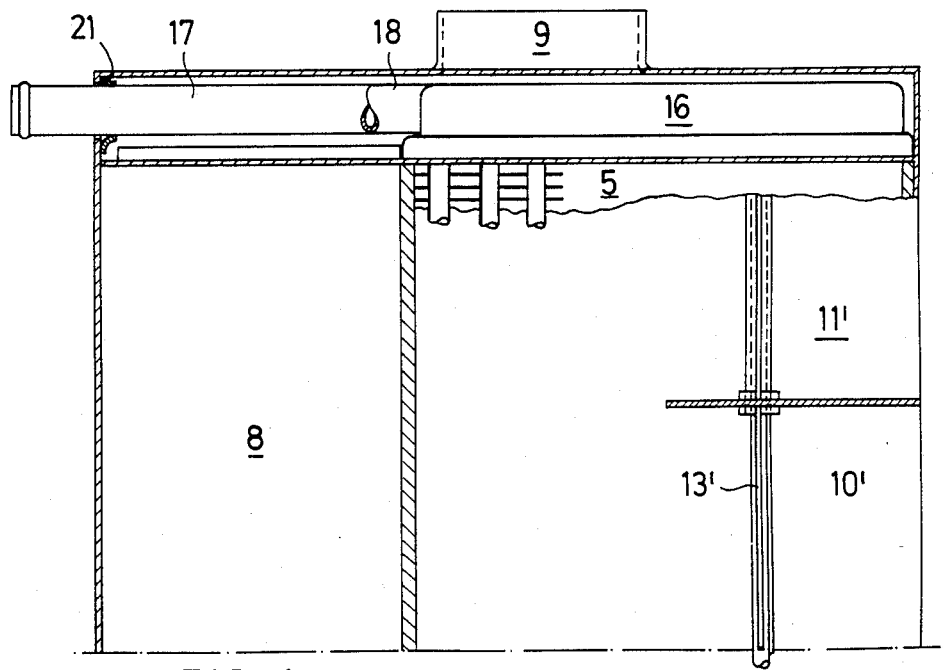
FIG. 4 is the right-hand half of the section along the line IV—IV in FIG. 3.
Figure 3:
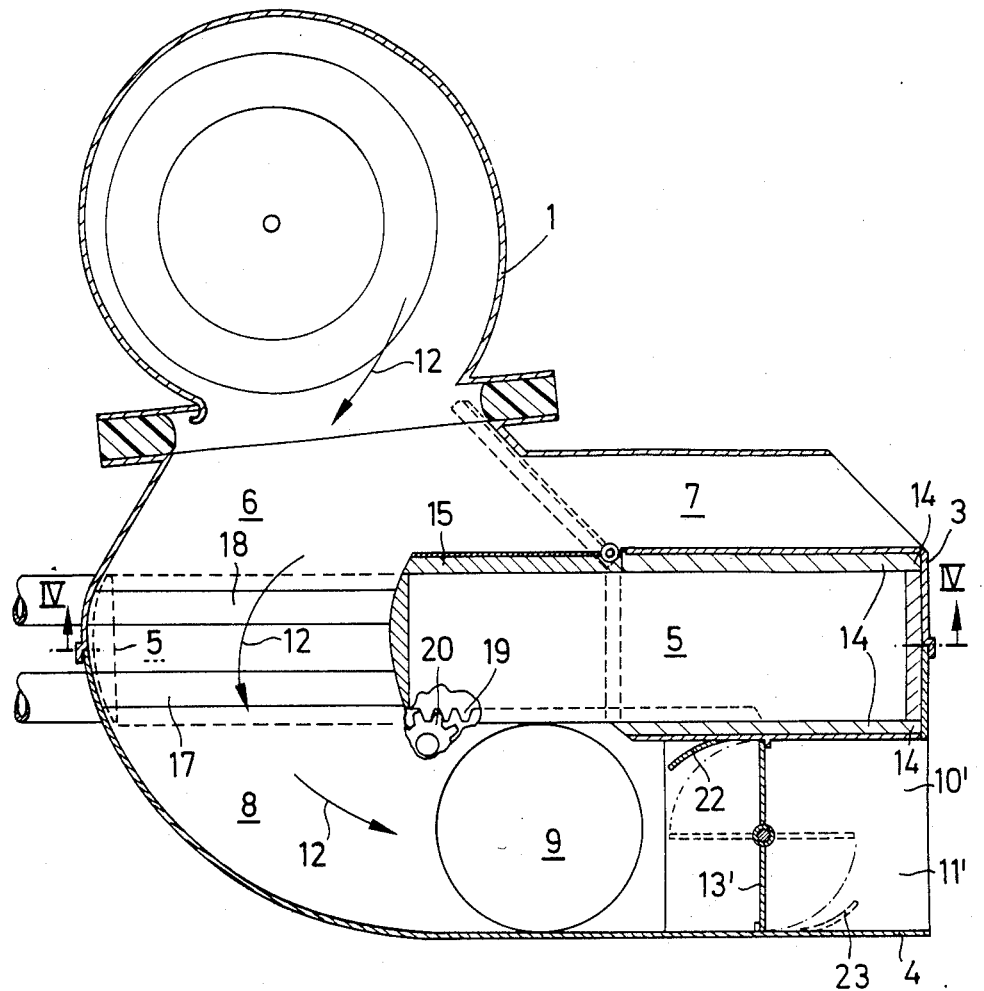
FIG. 3 is a similar section to FIG. 1 but with the outlet openings altered.

In FIGS. 3 and 4, a further embodiment is shown which essentially corresponds to that shown in FIGS. 1 and 2 and is accordingly provided with the same reference numerals. Here there is only a difference in the region of the connecting ducts to the defroster nozzles and the leg room outlets, which, in this case, are arranged not vertically one above the other, as in FIG. 1, but horizontally one beside the other.

They are controlled accordingly by a double-leaf flap 13′, and the connecting duct for the defroster nozzles is designated 10′ and that for the leg room outlets is designated 11′. The hot and cold air portions may be aligned with the outlet openings as desired by shields 22 or alternatively by shields 23.

Figure 5:
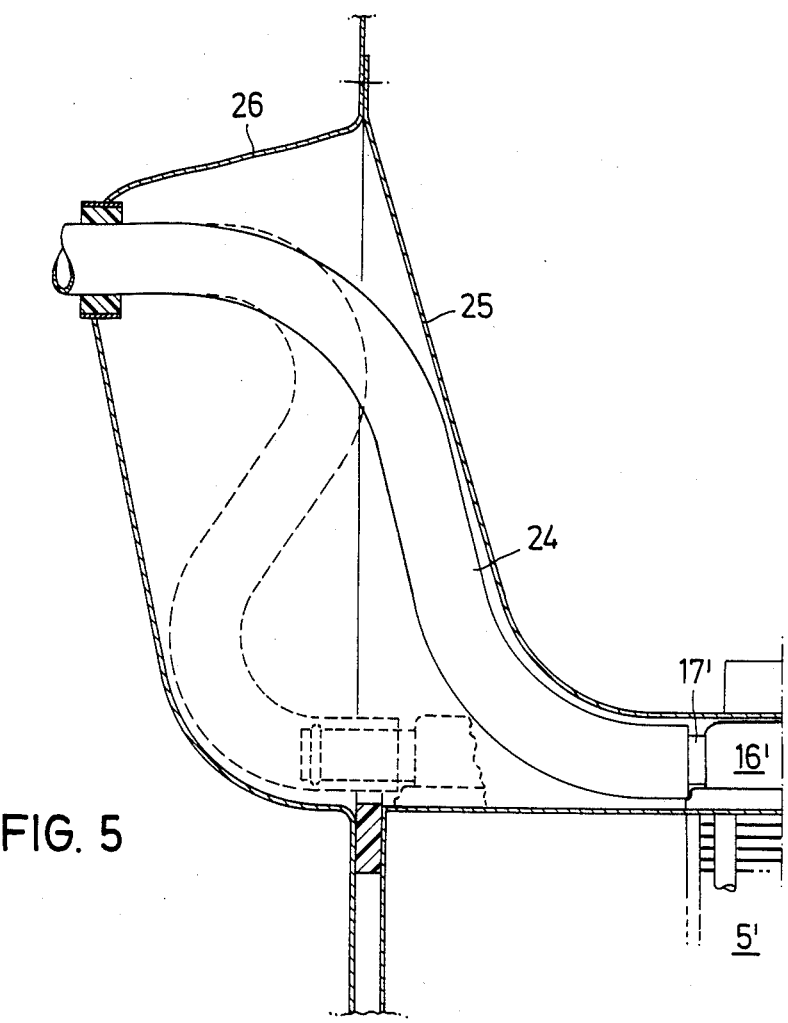
FIG. 5 is a horizontal plan view of the connection area of the heat exchanger.

FIG. 5 shows an advantageous possibility for connecting the displaceable heat exchanger. The water compartments 16′ of a heat exchanger 5′ are provided with relatively short pipe connections 17′. A molded hose 24 is connected on one end to the pipe connections 17′ and on the other end to corresponding connections on the cooling jacket of the internal combustion engine by way of conventional hose clips. The heating unit is connected to an additional lateral covering hood 25 and the dashboard of the vehicle is provided with a pocket 26 in which the molded hose 24 is arranged in such a way that it can move from its position shown in solid lines where the heat exchanger 5′ is in the cold position into its defored position shown in broken lines where the heat exchanger 5′ is in the hot position.

An S-shaped hose connection of this type from the displaceable heat exchanger to the cooling jacket of the internal combustion engine may also be made upwards in the vertical direction with a passage through the blower opening.

Figure 6:
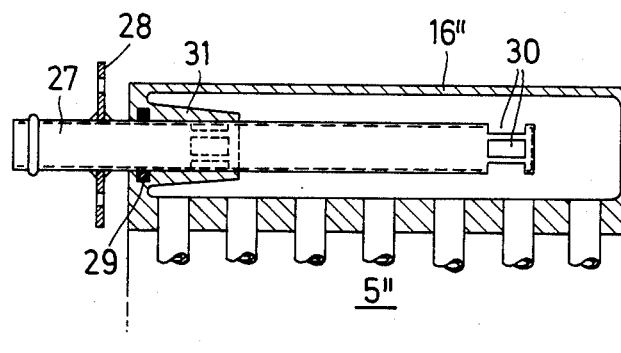
FIG. 6 is a horizontal section through a further embodiment of the connection area on the heat excahnger.

FIG. 6 shows a further advantageous possibility for connecting the displaceable heat exchanger. A heat exchanger 5″ is provided with a specially constructed water compartment 16″. A connecting pipe 27 is axially secured to an upper part of the casing by way of a flange 28 and extends, sealed by way of a seal 29, far into the interior of the water compartment 16″ which is shown here with the heat exchanger 5″ in the hot position. The inner end of the connecting pipe 27 is provided with openings 30 through which the cooling agent can pass into the interior of the water compartment.

If the heat exchanger 5″ moves to the right from its hot position shown in FIG. 6 into its cold position, the openings 30 come into the area of a cllar 31 in the interior of the water compartment 16″ and are closed thereby.

In this way, without substantial complexity, the water may be cut off in the cold position in addition to the temperture regulation with respect to the air.

What is claimed is:

1. A heating and ventilating unit for motor cars having air temperature regulation by a heat exchanger which may be variably slid into a fresh air stream and the operative surface of which is variably acted upon in a defined constant position approximately at right angles to the fresh air stream from a cold position substantially within a heat-insulated space into a hot position across the said fresh air stream, and a blower operatively associated with the air stream characterized in that the heat exchanger includes a casing and a water compartment and receives a connecting pipe axially secured in the casing by an attachment flange and projecting into its water compartment, the pipe being provided with openings which are closed by a collar carried within the water compartment when the heat exchanger is moved into its cold position.

2. In A heating and ventilating unit for motor vehicles of the type in which temperature regulation is effected by a heat exchanger slidably mounted for movement between a cold position in which the heat excahnger is carried within a heat insulated spaced and hot positions in which the heat exchanger is positioned across the fresh air stream and wherein water inlet and return conduits are provided for permitting circulation of water through a water compartment of the heat exchanger, an improvement wherein the conduits comprise at least one pipe axially secured in a wall of the water compartment by an attachment flange, radially extending openings in the pipe define the fluid communication with the water compartment, and a sealing collar is provided within the water compartment for slidingly receiving the pipe and operative to close the pipe openings when the heat exchanger is slid to the cold position.

* * * * *